(12) United States Patent
Brenneman et al.

(10) Patent No.: US 8,300,022 B2
(45) Date of Patent: Oct. 30, 2012

(54) DYNAMICALLY RECONFIGURABLE TOUCH SCREEN DISPLAYS

(75) Inventors: Robert J. Brenneman, Stormville, NY (US); Eli M. Dow, Poughkeepsie, NY (US); William J. Huie, Herndon, VA (US); Sarah J. Sheppard, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 747 days.

(21) Appl. No.: 12/351,423

(22) Filed: Jan. 9, 2009

(65) Prior Publication Data

US 2010/0177047 A1 Jul. 15, 2010

(51) Int. Cl.
*G06F 3/041* (2006.01)
(52) U.S. Cl. ........... 345/173; 345/1.1; 345/1.2; 345/1.3; 345/2.2
(58) Field of Classification Search .................. None
See application file for complete search history.

(56) References Cited

U.S. PATENT DOCUMENTS

| | | | | |
|---|---|---|---|---|
| 5,534,888 | A * | 7/1996 | Lebby et al. | 345/672 |
| 5,847,698 | A * | 12/1998 | Reavey et al. | 345/173 |
| 6,492,974 | B1 * | 12/2002 | Nobuchi et al. | 345/156 |
| 6,512,497 | B1 * | 1/2003 | Kondo et al. | 345/1.1 |
| 6,542,721 | B2 * | 4/2003 | Boesen | 455/553.1 |
| 6,628,244 | B1 * | 9/2003 | Hirosawa et al. | 345/2.3 |
| 6,882,335 | B2 * | 4/2005 | Saarinen | 345/156 |
| 7,126,588 | B2 * | 10/2006 | Oakley | 345/169 |
| 7,152,806 | B1 | 12/2006 | Rosen | |
| 7,433,179 | B2 * | 10/2008 | Hisano et al. | 361/679.27 |
| 7,489,286 | B2 * | 2/2009 | Kawase et al. | 345/1.1 |
| 7,542,052 | B2 * | 6/2009 | Solomon et al. | 345/659 |
| 7,708,240 | B2 * | 5/2010 | Homer et al. | 248/130 |
| 7,844,301 | B2 * | 11/2010 | Lee et al. | 455/566 |
| 7,864,517 | B2 * | 1/2011 | Miller et al. | 361/679.27 |
| 7,990,338 | B2 * | 8/2011 | Teng et al. | 345/1.3 |
| 2004/0049743 | A1 * | 3/2004 | Bogward | 715/531 |
| 2005/0093868 | A1 * | 5/2005 | Hinckley | 345/502 |

(Continued)

FOREIGN PATENT DOCUMENTS

WO 0241157 A2 5/2002

OTHER PUBLICATIONS

OLPC XO-2 Dual-touchscreen Concept Laptop to Sell for $75—Gizmo Watch, [online]; [retrieved on May 22, 2008]; retrieved from the Internet http://www.gizmowatch.com/entry/olpc-xo-2-dual-touchscreen-concept-laptop-to-sell-for-....

(Continued)

*Primary Examiner* — Dismery Mercedes
(74) *Attorney, Agent, or Firm* — Cantor Colburn LLP; Steven Chiu (57) ABSTRACT

A dynamically reconfigurable touch screen system includes a first display having a first touch screen, a second display having a second touch screen, the second display being operatively connected to the first display, at least one sensor operatively associated with one of the first and second displays. The at least one sensor detects a physical orientation of the one of the first and second touch screens. The dynamically reconfigurable touch screen system further includes a controller linked to the at least one sensor. The controller sets a display of the other of the first and second touch screens based on the physical orientation of the one of the first and second touch screens.

9 Claims, 6 Drawing Sheets

U.S. PATENT DOCUMENTS

| | | |
|---|---|---|
| 2005/0132922 A1 | 6/2005 | Thiesen et al. |
| 2006/0070103 A1 | 3/2006 | Vitito |
| 2006/0187142 A1* | 8/2006 | Lesniak .................. 345/1.1 |
| 2007/0100282 A1 | 5/2007 | Small et al. |
| 2007/0103447 A1 | 5/2007 | Varian et al. |
| 2007/0120762 A1* | 5/2007 | O'Gorman .................. 345/1.1 |
| 2007/0182663 A1* | 8/2007 | Biech ..................... 345/1.1 |
| 2008/0024388 A1* | 1/2008 | Bruce ..................... 345/1.1 |
| 2008/0075351 A1 | 3/2008 | Smith |
| 2009/0002391 A1* | 1/2009 | Williamson et al. ......... 345/619 |
| 2009/0003620 A1* | 1/2009 | McKillop et al. ............ 381/80 |
| 2009/0160734 A1* | 6/2009 | Chuang ..................... 345/1.3 |
| 2009/0244016 A1* | 10/2009 | Casparian et al. .......... 345/173 |
| 2010/0007613 A1* | 1/2010 | Costa ..................... 345/173 |
| 2010/0085274 A1* | 4/2010 | Kilpatrick et al. .......... 345/1.3 |
| 2010/0238196 A1* | 9/2010 | Hinterberger et al. ....... 345/649 |

OTHER PUBLICATIONS

Estari, inc.—Welcome to the future of mobile personal computing, [online]; [retrieved on May 22, 2008]; retrieved from the Internet http://www.estari.com/products.cfm.

Canovo dual-touchscreen tablet/notebook | DevicePedia.com, [online]; [retrieved on May 22, 2008]; retrieved from the Internet http://www.devicepedia.com/laptops/canovo-dual-touchscreen-tabletnotebook.html.

International Search Report and Written Opinion for corresponding PCT Application No. PCT/EP2010/067028, dated Mar. 8, 2011, pp. 1-10.

* cited by examiner

DYNAMICALLY RECONFIGURABLE TOUCH SCREEN DISPLAYS

BACKGROUND

This invention relates to the art of touch screen displays and, more particularly, to a dynamically reconfigurable touch screen display.

Conventional touch screens are typically static displays of buttons, graphics, and text fields having no awareness of orientation relative to any reference point such as, a user or to other touch screens. As such, devices that employ multiple touch screens, e.g., one screen as a display and another screen as a keyboard, must be properly oriented before use. Multiple touch screen devices are typically employed in presentations and usually include one screen as a control used by a presenter and another screen as a display for an audience. In this case, the device must be properly configured and positioned such that the control is positioned for the presenter.

SUMMARY OF THE INVENTION

A dynamically reconfigurable touch screen system includes a first display having a first touch screen, a second display having a second touch screen, the second display being operatively connected to the first display, at least one sensor operatively associated with one of the first and second displays. The at least one sensor detects a physical orientation of the one of the first and second touch screens. The dynamically reconfigurable touch screen system further includes a controller linked to the at least one sensor. The controller sets a display of the other of the first and second touch screens based on the physical orientation of the one of the first and second touch screens.

In accordance with another exemplary embodiment of the invention, dynamically reconfiguring touch screens includes detecting a physical orientation of a first touch screen of a first display relative to a physical orientation of a second touch screen of a second display, and adjusting a display of the second touch screen based on the physical orientation of the first touch screen.

Additional features and advantages are realized through the techniques of exemplary embodiments of the present invention. Other exemplary embodiments and aspects of the invention are described in detail herein and are considered a part of the claimed invention. For a better understanding of the invention with advantages and features, refer to the description and to the drawings.

BRIEF DESCRIPTION OF THE SEVERAL VIEWS OF THE DRAWINGS pointed out and distinctly claimed in the claims at the conclusion of the specification. The foregoing and other objects, features, and advantages of the invention are apparent from the following detailed description taken in conjunction with the accompanying drawings in which:

The detailed description explains the exemplary embodiments of the invention, together with advantages and features, by way of example with reference to the drawings.

DETAILED DESCRIPTION

With initial reference to FIGS. 1-6, the dynamically reconfigurable touch screen system constructed in accordance with exemplary embodiments of the invention is indicated generally at 2. Touch screen system 2 includes a first display 4 having a first touch screen 6 and a second display 14 having a second touch screen 16. In the exemplary embodiment shown, first and second displays 4 and 14 are operatively connected through an articulating hinge 24. Articulating hinge 24 enables first display 4 and second display 14 to be selectively positionable in any number of a plurality of orientations such as, but not limited to, the orientations depicted in FIGS. 1-6.

In accordance with one aspect of the exemplary embodiment, first display 4 includes a controller 26 operatively connected to a sensor 30. Sensor 30 determines a physical orientation of first touch screen 6 relative to a physical orientation of second touch screen 16. In accordance with one aspect of the invention, sensor 30 takes the form of a position center such as, but not limited to an accelerometer, that determines a physical orientation of first touch screen 6 relative to the physical orientation of touch screen 16. In accordance with another exemplary aspect of the invention, sensor 30 takes the form of a digital camera that captures an image of an object not associated with either first display 4 or second display 14 to establish a point of reference. Based on the point of reference, controller 26 determines the physical orientation of first touch screen 6 and, as a consequence, the physical orientation of second touch screen 16.

In accordance with yet another aspect of the exemplary embodiment shown in FIGS. 1-6, touch screen system 2 includes a second sensor 34 operatively associated with second display 14. Second sensor 34 is operatively connected to controller 26 and, in combination with sensor 30 determines a physical orientation of first touch screen 6 relative to second touch screen 16. In this manner, dynamically reconfigurable touch screen system 2 can be placed in any one of a number of physical orientations with each display of each touch screen being adjusted to accommodate the associated physical orientation. More specifically, regardless of physical orientation, one of first and second touch screens 6 and 16 is configured as a display, and the other first and second touch screens 6 and 16 is configured as a keyboard. Alternatively, one of first and second touch screens 6 and 16 is configured to display a first page of a book, and the other of first and second touch screens 6 and 16 is configured to display a second page of a book. In either case, changes in physical orientation of either first and second displays 4 and 16 results in a corresponding display of any subject matter, e.g., key board, graphics, text etc., of the information presented on touch screens 6 and 16 respectively.

Figure 1:
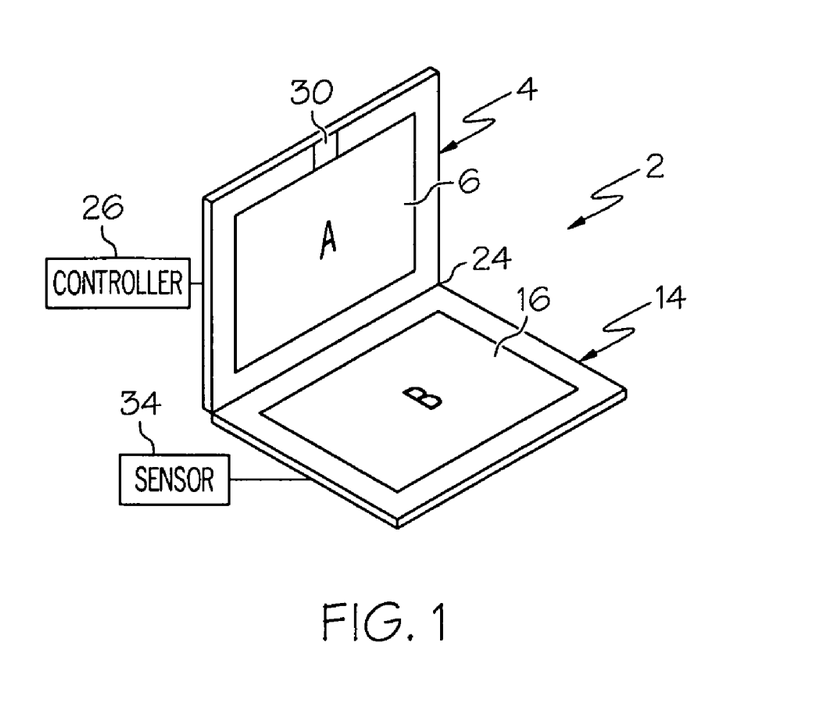
FIG. 1 illustrates a dynamically reconfigurable touch screen system in accordance with an exemplary embodiment of the invention arranged in a first configuration.
Figure 2:
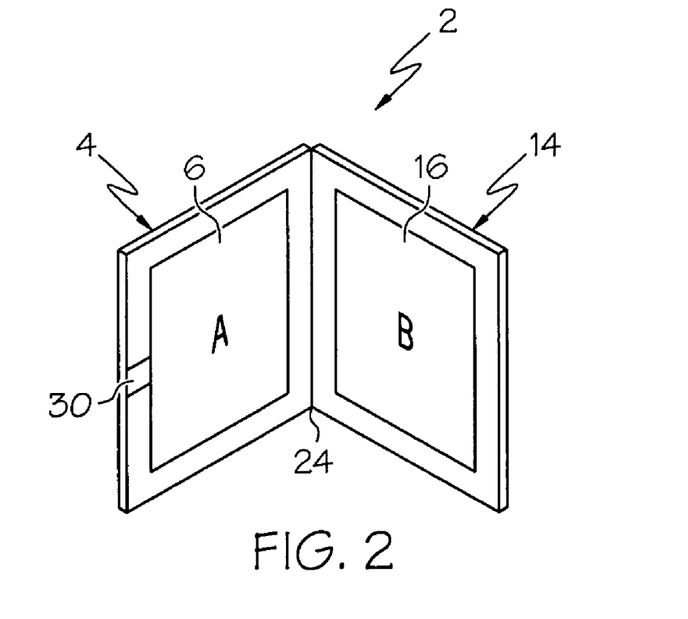
FIG. 2 illustrates a dynamically reconfigurable touch screen system in accordance with an exemplary embodiment of the invention arranged in a second configuration.
Figure 3:
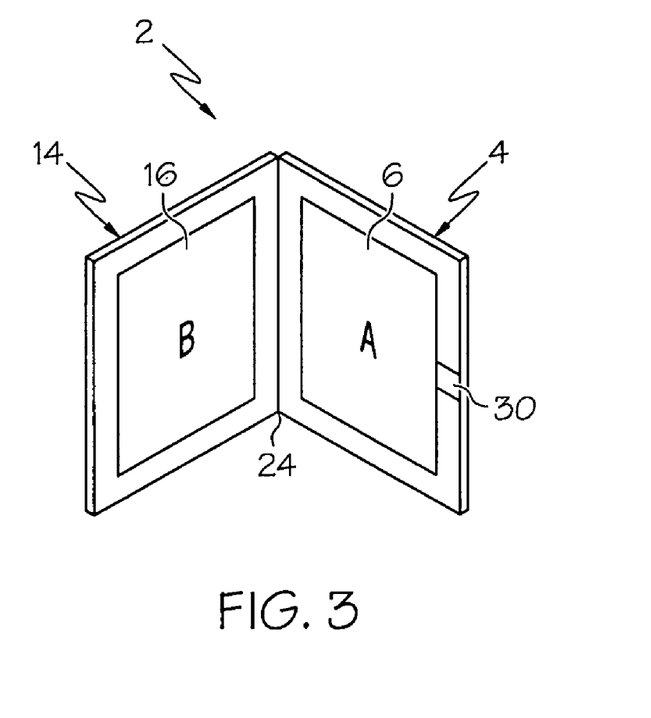
FIG. 3 illustrates a dynamically reconfigurable touch screen system in accordance with an exemplary embodiment of the invention arranged in a third configuration.
Figure 4:
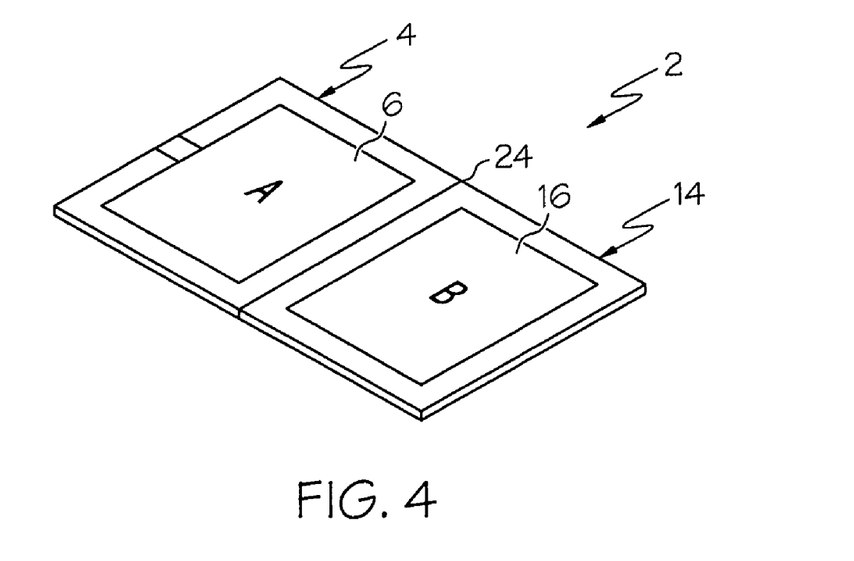
FIG. 4 illustrates a dynamically reconfigurable touch screen system in accordance with an exemplary embodiment of the invention arranged in a fourth configuration.

As discussed above, dynamically reconfigurable touch screen system is configured in a book configuration (see FIG. 2) such that first touch screen 6 and second touch screen 16 are in portrait mode. In this configuration, a user can, read a book and, flip pages electronically figuratively between first and second touch screens 6 and 16. This is, one of first and second touch screens 6 and 16 is provided with controls (not shown) that enable the user to electronically turn pages or pages are changed by simply touching one of first and second touch screens 6 and 16. Of course, it should be appreciated that dynamically reconfigurable touch screen system 2 can be rotated 180 degrees, such as illustrated in FIG. 3, with first and second touch screens 6 and 16 remaining in portrait mode while, the display, i.e., any displayed text or controls are reconfigured based on the physical orientation of first and second displays 4 and 14. Likewise, in FIG. 4, dynamically reconfigurable touch screen system 2 can be laid out and spread open such that first and second displays are arranged along a single plane with the sensor 30 establishing a particular configuration for first and second touch screens 6 and 16.

Figure 5:
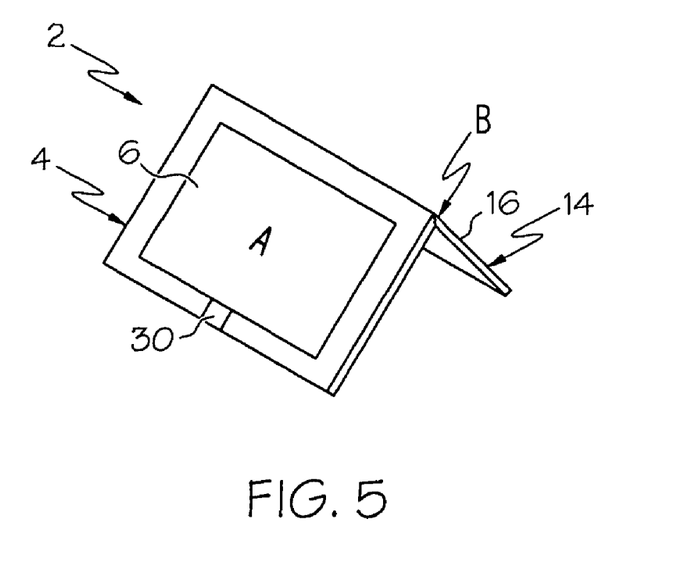
FIG. 5 illustrates a dynamically reconfigurable touch screen system in accordance with an exemplary embodiment of the invention arranged in a fifth configuration.
Figure 6:
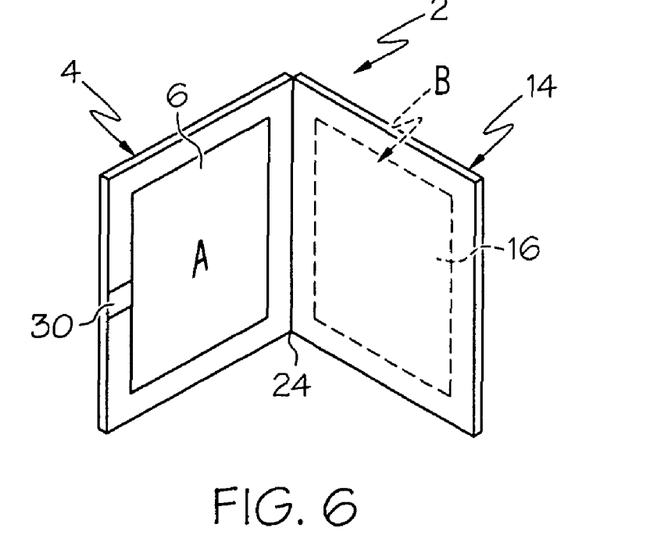
FIG. 6 illustrates a dynamically reconfigurable touch screen system in accordance with an exemplary embodiment of the invention arranged in a sixth configuration.

FIG. 5 illustrates dynamically reconfigurable touch screen system 2 in a tented configuration such as when employed in connection with presenting graphic data to an audience. In this manner, for example, first screen 6 includes a display and controls allowing a presenter to change and control information presented on second touch screen 16. Similarly, in FIG. 6, first screen 6 is presented in a portrait mode with second touch screen 16 facing outward to an audience. In this manner, the presenter can change data presented on second touch screen 16 through controls provided on first touch screen 6.

Figure 7:
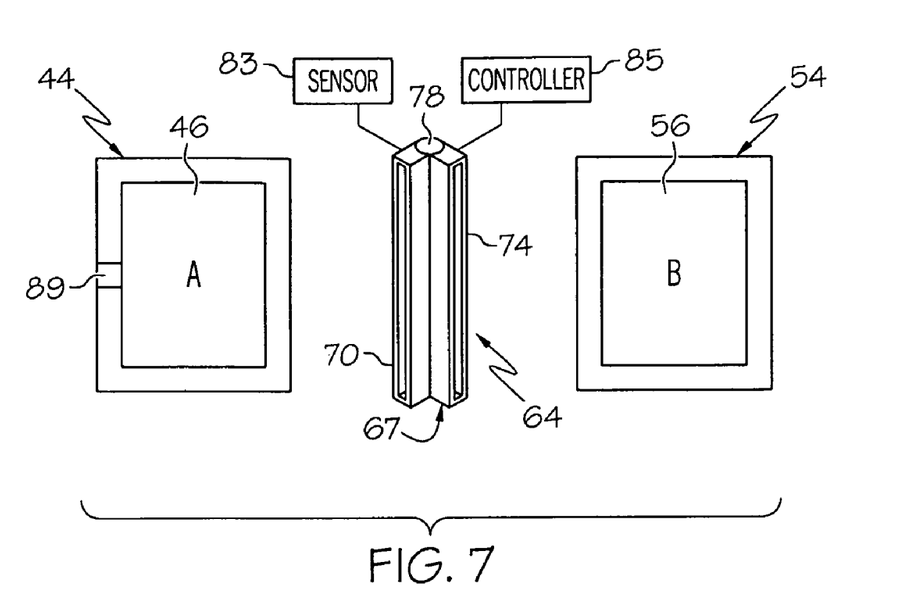
FIG. 7 illustrates a dynamically reconfigurable touch screen system including first and second displays and a docking member in accordance with another exemplary embodiment of the invention.
Figure 8:
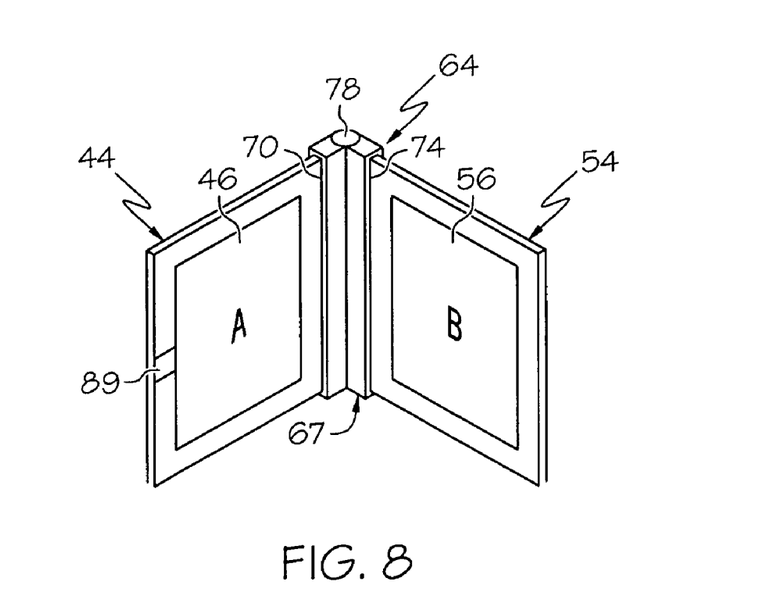
FIG. 8 illustrates the dynamically reconfigurable touch screen system of FIG. 7 with the first and second displays mounted to the docking member in a first configuration.
Figure 9:
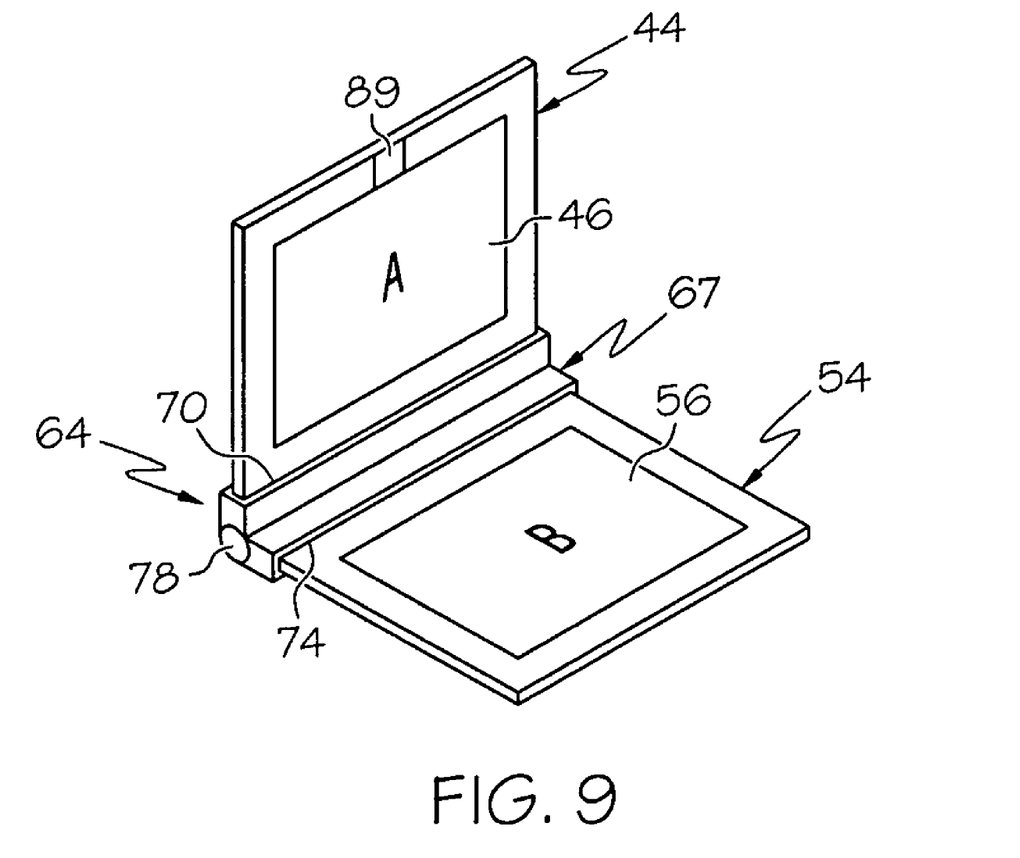
FIG. 9 illustrates the dynamically reconfigurable touch screen system of FIG. 7 with the first and second displays mounted to the docking member in a second configuration.

Reference will now be made to FIGS. 7-9 in describing a dynamically reconfigurable touch screen system 42 constructed in accordance with another exemplary embodiment of the invention. As shown in FIG. 7, dynamically reconfigurable touch screen system 42 includes a first display 44 having a first touch screen 46 and a second display 54 having a second touch screen 56. In addition to first and second displays 44 and 54, dynamically reconfigurable touch screen system 42 includes a docking member 64. Docking member 64 includes a main body 67 having a first receiving port 70 and a second receiving port 74. In the exemplary embodiment shown, docking member 64 further includes a hinge 78 enabling first receiving port 70 to articulate relative to second receiving port 74. Docking member 64 further includes a sensor 83 operatively connected to a controller 85. As will be discussed more fully below, sensor 83 determines a particular physical orientation of docking member 64 and, as a consequence, corresponding displays of first and second touch screens 46 and 56.

As shown in FIG. 8, first display 44 is mounted to first receiving port 70 while second display 54 is mounted to second receiving port 74. In this particular configuration, the physical orientation of first and second displays 44 and 54 are in portrait mode with sensor 83, and controller 85, determining a particular display for each touch screen 46 and 56 in order to properly present data thereon. Similarly, the physical orientation of first and second displays 44 and 54 can be configured in landscape mode such as shown in FIG. 9 with sensor 83, through controller 85 determining the particular display of each of first and second touch screens 46 and 56. Of course, it should be understood that sensor 83 can be replaced by a sensor 89 mounted to, for example, first display 44. Sensor 89 is operatively connected to controller 85 when first display 44 is mounted to first receiving port 70. Sensor 89 can take on a variety of forms such as, for example, orientation sensors, position sensors and, a digital camera as described above. In any event, it should be understood that the particular connection between first and second displays 44 and 54 relative to docking member 54 can vary.

The capabilities of the present invention can be implemented in software, firmware, hardware or some combination thereof.

Figure 10:
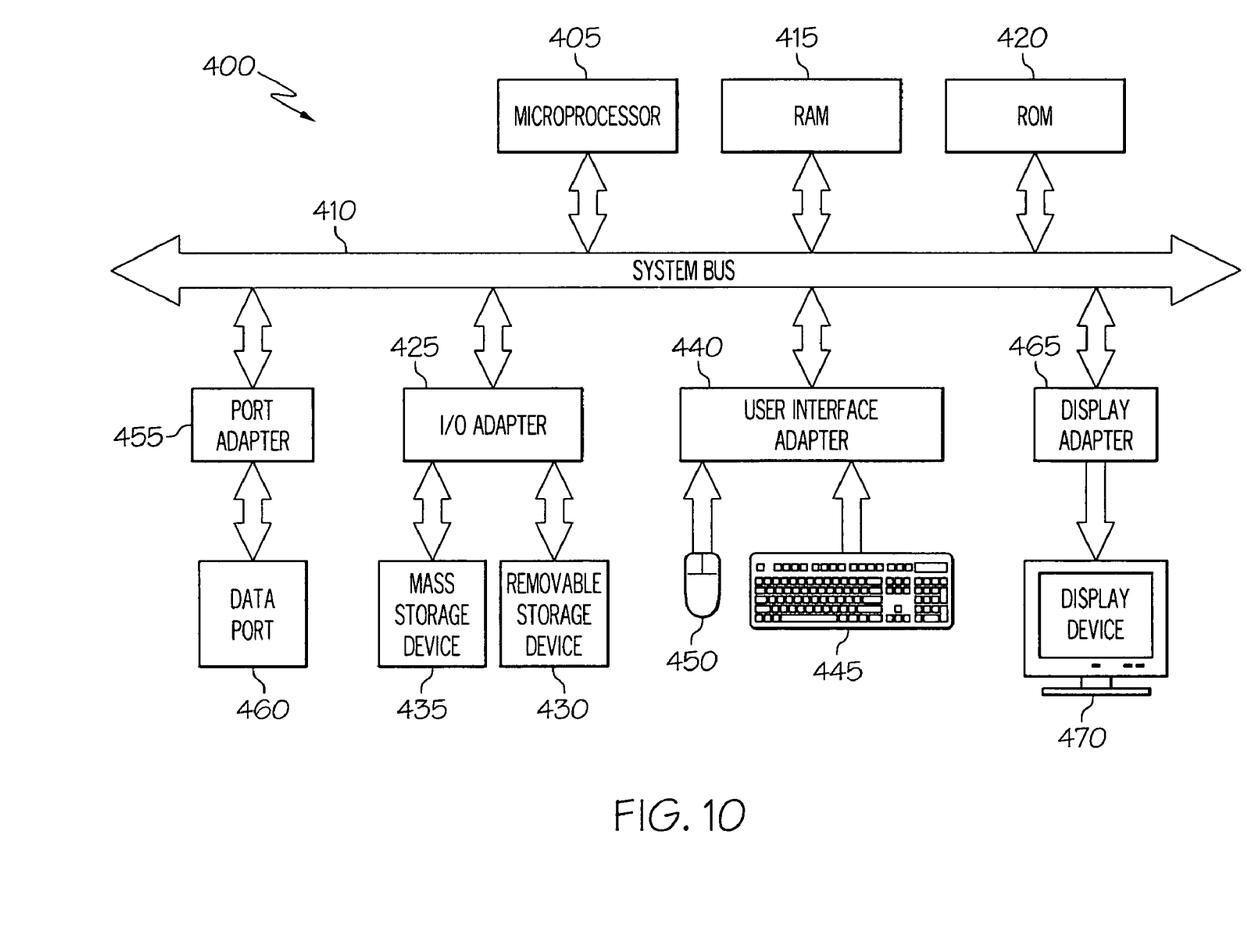
FIG. 10 is a schematic block diagram of a general-purpose computer suitable for practicing the present invention exemplary embodiments.

As one example, the method of dynamically reconfiguring touch screens described herein is practiced with a general-purpose computer and the method may be coded as a set of instructions on removable or hard media for use by the general-purpose computer. FIG. 10 is a schematic block diagram of a general-purpose computer suitable for practicing the present invention embodiments. In FIG. 10, computer system 400 has at least one microprocessor or central processing unit (CPU) 405. CPU 405 is interconnected via a system bus 410 to a random access memory (RAM) 415, a read-only memory (ROM) 420, an input/output (I/O) adapter 425 for a connecting a removable data and/or program storage device 430 and a mass data and/or program storage device 435, a user interface adapter 440 for connecting a keyboard 445 and a mouse 450, a port adapter 455 for connecting a data port 460 and a display adapter 465 for connecting a display device 470.

At this point, it should be understood that the embodiments of the present invention provide a solution which enables the use of multiple touch screen displays regardless of an orientation of any one particular touch screen. That is, exemplary embodiments of the present invention operatively link multiple touch screen displays such as that one display detects the orientation of another display. Based on the orientation of the display, information is presented on each touch screen in a particular format. It should also be understood that, while shown in connection with two displays, the present invention can include any one of a multitude of displays with each display sensing a particular orientation of others of the multiple displays. The multiple displayed can be configured in various geometric shapes such as, for example, a cube.

ROM 420 contains the basic operating system for computer system 400. The operating system may alternatively reside in RAM 415 or elsewhere as is known in the art. Examples of removable data and/or program storage device 430 include magnetic media such as floppy drives and tape drives and optical media such as CD ROM drives. Examples of mass data and/or program storage device 435 include hard disk drives and non-volatile memory such as flash memory. In addition to keyboard 445 and mouse 450, other user input devices such as trackballs, writing tablets, pressure pads, microphones, light pens and position-sensing screen displays may be connected to user interface 440. Examples of display devices include cathode-ray tubes (CRT) and liquid crystal displays (LCD).

A computer program with an appropriate application interface may be created by one of skill in the art and stored on the system or a data and/or program storage device to simplify the practicing of this invention. In operation, information for or the computer program created to run the present invention is loaded on the appropriate removable data and/or program storage device 430, fed through data port 460 or typed in using keyboard 445.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

The invention claimed is:

1. A dynamically reconfigurable touch screen system comprising: a first display having a first touch screen; a second display having a second touch screen, the second display being operatively connected to the first display; at least one sensor operatively associated with one of the first and second displays, the at least one sensor detecting a physical orientation of the corresponding one of the first and second touch screens; a docking member including a first receiving port for receiving the first display and a second receiving port for receiving the second display; and a controller arranged within the docking member and linked to the at least one sensor, the controller setting a display orientation of the other of the first and second touch screens based on the physical orientation of the one of the first and second touch screens; and an articulated hinge member interconnecting the first and second displays, the at least one sensor being arranged at the articulated hinge.

2. The dynamically reconfigurable touch screen system according to claim 1, wherein the at least one sensor is an accelerometer.

3. The dynamically reconfigurable touch screen system according to claim 1, wherein the at least one sensor is a camera.

4. The dynamically reconfigurable touch screen system according to claim 1, wherein the at least one sensor includes a first sensor operatively associated with the first display and a second sensor operatively associated with the second display.

5. The dynamically reconfigurable touch screen system according to claim 1, wherein the at least one sensor is mounted in the docking member.

6. A method of dynamically reconfiguring touch screens, the method comprising: mounting a first display in a first receiving portion of a docking member; mounting a second display in a second receiving port of the docking member; establishing a physical orientation of the first display relative to the physical orientation of the second display through the docking member; detecting a physical orientation of a first touch screen of the first display relative to a physical orientation of a second touch screen of the second display; and adjusting a display orientation of the second touch screen based on the physical orientation of the first touch screen; and articulating the first touch screen relative to the second touch screen through a hinge provided in the docking member, wherein the hinge establishes the physical orientation of the first touch screen relative to the physical orientation of the second touch screen.

7. The method of claim 6, further comprising: sensing with a camera mounted to one of the first and second displays an object not associated with either of the first and second touch screen to develop a point of reference, the point of reference establishing the physical orientation of the first touch screen relative to the physical orientation of the second touch screen.

8. A system for dynamically reconfiguring touch screens comprising: a central processing unit (CPU), said CPU being interconnected functionally via a system bus to: an input/output (I/O) adapter connecting to at least one of a removable data storage device, a program storage device, and a mass data storage device; a user interface adapter connecting to one or more computer input devices; a display adapter connecting to a display device; and at least one memory device thereupon stored a set of instructions which, when executed by said CPU, causes said system to: establish a physical orientation of a first display relative to a physical orientation of a second display based on a relative connection to first and second receiving portions provided on a docking member; detect a physical orientation of a first touch screen of the first display relative to a physical orientation of a second touch screen of the second display; sensed through a hinge incorporated into the docking member interconnecting the first and second displays; and adjust a display orientation of the second touch screen based on the physical orientation of the first touch screen.

9. The system of claim 8, wherein the set of instructions which, when executed by said CPU, causes said system to:
sense with a camera mounted to one of the first and second displays an object not associated with either of the first and second touch screen to develop a point of reference, the point of reference establishing the physical orientation of the first touch screen relative to the physical orientation of the second touch screen.

* * * * *